US011030621B2

(12) United States Patent
Castinado et al.

(10) Patent No.: US 11,030,621 B2
(45) Date of Patent: *Jun. 8, 2021

(54) SYSTEM TO ENABLE CONTACTLESS ACCESS TO A TRANSACTION TERMINAL USING A PROCESS DATA NETWORK

(71) Applicant: Bank of America Corporation, Charlotte, NC (US)

(72) Inventors: Joseph Benjamin Castinado, North Glenn, CO (US); Manu Jacob Kurian, Dallas, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 140 days.

This patent is subject to a terminal disclaimer.

(21) Appl. No.: 16/552,069

(22) Filed: Aug. 27, 2019

(65) Prior Publication Data
US 2019/0385165 A1 Dec. 19, 2019

Related U.S. Application Data

(63) Continuation of application No. 15/050,307, filed on Feb. 22, 2016, now Pat. No. 10,496,989.

(51) Int. Cl.
*G06Q 20/40* (2012.01)
*G06Q 20/34* (2012.01)
(Continued)

(52) U.S. Cl.
CPC ......... *G06Q 20/401* (2013.01); *G06Q 20/327* (2013.01); *G06Q 20/352* (2013.01);
(Continued)

(58) Field of Classification Search
CPC ............. G06Q 20/382; G06Q 20/4014; G06Q 20/4016; G06Q 20/227
See application file for complete search history.

(56) References Cited

U.S. PATENT DOCUMENTS 5,671,283 A  9/1997 Michener et al.
5,835,599 A  11/1998 Buer
(Continued)

FOREIGN PATENT DOCUMENTS

WO  2014162296 A1  10/2014
WO  2015135018 A1  9/2015

OTHER PUBLICATIONS

Buterin, Vitalik, "On Public and Private Blockchains", Aug. 7, 2015. https://blog.ethereum.org/2015/08/07/on-public-and-private-blockchains/.
(Continued)

*Primary Examiner* — Johann Y Choo
(74) *Attorney, Agent, or Firm* — Michael A. Springs; Moore & Van Allen PLLC; Anup Shrinivasan Iyer

(57) ABSTRACT

Systems, computer program products, and methods are described herein for a system to enable contactless access to a transaction terminal using a process data network. The present invention is configured to electronically receive from a transfer terminal, an indication that a user is accessing the transaction terminal using a user device; retrieve, from the user device, a unique identifier associated with the user device; compare the unique identifier with a block chain of authentication information associated with the user to determine whether the unique identifier meets a condition associated with the block chain authentication information; receive an indication that the unique identifier meets the condition of the block chain thereby validating user identity; and allow the user to access the transaction terminal based on at least receiving the indication that the unique identifier meets the condition of the block chain.

18 Claims, 7 Drawing Sheets

(51) Int. Cl.
*G06Q 20/32* (2012.01)
*G06Q 20/38* (2012.01)
*H04L 29/06* (2006.01)
*H04W 12/06* (2021.01)
*H04L 9/32* (2006.01)

(52) U.S. Cl.
CPC ..... *G06Q 20/38215* (2013.01); *H04L 9/3236* (2013.01); *H04L 63/0823* (2013.01); *H04W 12/06* (2013.01); *H04L 2209/38* (2013.01); *H04L 2209/56* (2013.01)

(56) References Cited

U.S. PATENT DOCUMENTS

| | | | |
|---|---|---|---|
| 6,073,234 | A | 6/2000 | Kenichiro et al. |
| 6,324,286 | B1 | 11/2001 | Lai et al. |
| 6,330,655 | B1* | 12/2001 | Vishlitzky ............. G06F 3/0607 711/112 |
| 6,725,303 | B1 | 4/2004 | Hoguta et al. |
| 6,850,252 | B1 | 2/2005 | Hoffberg |
| 6,973,187 | B2 | 12/2005 | Gligor et al. |
| 7,055,039 | B2 | 5/2006 | Chavanne et al. |
| 7,092,400 | B2 | 8/2006 | Malzahn |
| 7,184,549 | B2 | 2/2007 | Sorirnachi et al. |
| 7,362,859 | B1 | 4/2008 | Robertson et al. |
| 7,392,384 | B2 | 6/2008 | Hopkins et al. |
| 7,428,306 | B2 | 9/2008 | Celikkan et al. |
| 7,502,933 | B2 | 3/2009 | Jakobsson et al. |
| 7,574,401 | B1 | 8/2009 | Burns |
| 7,649,992 | B2 | 1/2010 | Raju et al. |
| 7,764,788 | B2 | 7/2010 | Tardo |
| 7,979,889 | B2 | 7/2011 | Gladstone et al. |
| 8,078,874 | B2 | 12/2011 | You et al. |
| 8,107,621 | B2 | 1/2012 | Celikkan et al. |
| 8,155,311 | B2 | 4/2012 | Shin et al. |
| 8,259,934 | B2 | 9/2012 | Karroumi et al. |
| 8,358,781 | B2 | 1/2013 | Schneider |
| 8,396,209 | B2 | 3/2013 | Schneider |
| 8,397,841 | B1 | 3/2013 | Griffo et al. |
| 8,416,947 | B2 | 4/2013 | Schneider |
| 8,458,461 | B2 | 6/2013 | Tardo |
| 8,464,320 | B2 | 6/2013 | Archer et al. |
| 8,516,266 | B2 | 8/2013 | Hoffberg et al. |
| 8,590,055 | B2 | 11/2013 | Yoon et al. |
| 8,737,606 | B2 | 5/2014 | Taylor et al. |
| 8,942,374 | B2 | 1/2015 | Fujisaki |
| 8,983,063 | B1 | 3/2015 | Taylor et al. |
| 9,059,866 | B2 | 6/2015 | Bar-Sade et al. |
| 9,083,702 | B2 | 7/2015 | Wied et al. |
| 9,092,766 | B1 | 7/2015 | Bedier et al. |
| 9,298,806 | B1 | 3/2016 | Vessenes et al. |
| 9,635,000 | B1 | 4/2017 | Muftic |
| 9,672,499 | B2 | 6/2017 | Yang et al. |
| 2001/0020249 | A1* | 9/2001 | Shim ........................ H04L 67/26 709/220 |
| 2003/0126094 | A1 | 7/2003 | Fisher et al. |
| 2004/0172535 | A1 | 9/2004 | Jakobsson et al. |
| 2004/0199463 | A1 | 10/2004 | Deggendorf |
| 2005/0256802 | A1 | 11/2005 | Ammermann et al. |
| 2009/0094075 | A1* | 4/2009 | Parisien ............. G06Q 10/0875 705/7.12 |
| 2009/0125986 | A1* | 5/2009 | Kiester .................... G06F 21/31 726/4 |
| 2009/0281948 | A1 | 11/2009 | Carlson |
| 2010/0107225 | A1* | 4/2010 | Spencer .................. G06F 21/85 726/4 |
| 2010/0279653 | A1 | 11/2010 | Poltorak |
| 2011/0055913 | A1* | 3/2011 | Wong .................... H04L 9/3226 726/9 |
| 2011/0078073 | A1 | 3/2011 | Annappindi |
| 2011/0197064 | A1 | 8/2011 | Garcia Morchon et al. |
| 2012/0066121 | A1 | 3/2012 | Shahbazi et al. |
| 2012/0284175 | A1 | 11/2012 | Wilson et al. |
| 2013/0198061 | A1 | 8/2013 | Dheer et al. |
| 2013/0204783 | A1* | 8/2013 | Klose .................... G06Q 20/042 705/42 |
| 2013/0232056 | A1 | 9/2013 | Schulman |
| 2013/0346294 | A1* | 12/2013 | Faith .................... G06F 21/552 705/39 |
| 2014/0006185 | A1 | 1/2014 | Zurn et al. |
| 2014/0089243 | A1 | 3/2014 | Oppenheimer |
| 2014/0114857 | A1* | 4/2014 | Griggs ................... G06Q 40/00 705/44 |
| 2014/0295956 | A1* | 10/2014 | Katz .................... G07F 17/3237 463/29 |
| 2014/0310171 | A1 | 10/2014 | Grossman et al. |
| 2015/0127527 | A1 | 5/2015 | Eide |
| 2015/0172053 | A1 | 6/2015 | Schwarz et al. |
| 2015/0206106 | A1 | 7/2015 | Yago |
| 2015/0262137 | A1 | 9/2015 | Armstrong |
| 2015/0332283 | A1 | 11/2015 | Witchey |
| 2015/0379510 | A1 | 12/2015 | Smith |
| 2015/0379636 | A1 | 12/2015 | Szabo et al. |
| 2016/0012424 | A1 | 1/2016 | Simon et al. |
| 2016/0028552 | A1 | 1/2016 | Spanos et al. |
| 2016/0050203 | A1 | 2/2016 | Hefetz |
| 2016/0092874 | A1 | 3/2016 | O'Regan et al. |
| 2016/0125376 | A1 | 5/2016 | Beatty et al. |
| 2016/0191243 | A1 | 6/2016 | Manning |
| 2016/0260171 | A1 | 9/2016 | Ford et al. |
| 2016/0275461 | A1 | 9/2016 | Sprague et al. |
| 2016/0292672 | A1 | 10/2016 | Fay et al. |
| 2016/0321654 | A1 | 11/2016 | Lesavich et al. |
| 2016/0323109 | A1 | 11/2016 | McCoy et al. |
| 2016/0342978 | A1 | 11/2016 | Davis et al. |
| 2016/0342989 | A1 | 11/2016 | Davis |
| 2017/0005804 | A1 | 1/2017 | Zinder |
| 2017/0011460 | A1 | 1/2017 | Molinari et al. |
| 2017/0046526 | A1 | 2/2017 | Chan et al. |
| 2017/0046651 | A1 | 2/2017 | Lin et al. |
| 2017/0046664 | A1 | 2/2017 | Haldenby et al. |
| 2017/0046680 | A1 | 2/2017 | Crites |
| 2017/0046806 | A1* | 2/2017 | Haldenby ............... G06Q 10/08 |
| 2017/0048216 | A1 | 2/2017 | Chow et al. |
| 2017/0091397 | A1 | 3/2017 | Shah |
| 2017/0103167 | A1 | 4/2017 | Shah |
| 2017/0103461 | A1 | 4/2017 | Acuna-Rohter et al. |
| 2017/0109735 | A1 | 4/2017 | Sheng et al. |
| 2017/0116693 | A1 | 4/2017 | Rae et al. |
| 2017/0132625 | A1 | 5/2017 | Kennedy |
| 2017/0132626 | A1 | 5/2017 | Kennedy |
| 2017/0132630 | A1 | 5/2017 | Castinado et al. |
| 2017/0140375 | A1 | 5/2017 | Kunstel |
| 2017/0163733 | A1 | 6/2017 | Grefen et al. |
| 2017/0177855 | A1 | 6/2017 | Costa et al. |
| 2017/0178131 | A1 | 6/2017 | Fernandez |
| 2017/0178237 | A1 | 6/2017 | Wong |
| 2017/0180134 | A1 | 6/2017 | King |
| 2017/0200137 | A1 | 7/2017 | Vilmont |
| 2017/0213209 | A1 | 7/2017 | Dillenberger |
| 2017/0214675 | A1 | 7/2017 | Johnsrud et al. |
| 2017/0214698 | A1 | 7/2017 | Hughes et al. |
| 2017/0220998 | A1 | 8/2017 | Horn et al. |
| 2017/0221052 | A1 | 8/2017 | Sheng et al. |
| 2017/0223005 | A1 | 8/2017 | Birgisson et al. |
| 2017/0228447 | A1 | 8/2017 | Catania et al. |
| 2017/0228822 | A1 | 8/2017 | Creighton, IV et al. |
| 2017/0230375 | A1* | 8/2017 | Kurian .................. H04L 63/102 |
| 2017/0230378 | A1 | 8/2017 | Bliss |
| 2017/0232300 | A1 | 8/2017 | Tran et al. |
| 2017/0235955 | A1 | 8/2017 | Barkan |
| 2017/0236407 | A1 | 8/2017 | Rhoads et al. |
| 2017/0243020 | A1 | 8/2017 | Dhondse et al. |
| 2017/0243287 | A1* | 8/2017 | Johnsrud ................ G06Q 20/02 |
| 2018/0053161 | A1 | 2/2018 | Bordash et al. |
| 2018/0268479 | A1 | 9/2018 | Dowling et al. |

OTHER PUBLICATIONS

Tasca. "Digital currencies: Principles, trends, opportunities, and risks." In: Trends, Opportunities, and Risks. Sep. 7, 2015 (Sep. 7, 2015) Retrieved from <https://www.researchgate.net/profile/Paolo_

(56) References Cited

OTHER PUBLICATIONS

Tasca/publication/290805276 Digital Currencies Principles Trends Opportunities and Risks/links/569bb91e08ae6169e5624552.pif> p. 5, 10, 12, 14.

Lerner. "MAVEPAY, A New Lightweight Payment Scheme for Peer to Peer Currency Networks." Apr. 17, 2012.

Malahov, Yanislav Georgiev, "BitAlias 1, Aka Usernames for Bitcoin, A New, Simple Naming System for Bitcoin Addresses", retrieved from https://medium.com/bitalias-decentralized-naming-and-identity-service/bitalias-7b66bffed9d8 on Mar. 12, 2017; Bringing Crypto to the People, Founder of www.aeternity.com, Jun. 6, 2015.

PCT International Searching Authority: International Search Report and Written Opinion for PCT/US2016/061402 dated Dec. 27, 2016.

PCT International Searching Authority: Written Opinion for PCT/IB16/01655 completed Mar. 11, 2017, 8 pages.

PCT International Searching Authority; International Search Report for PCT/IB16/01655 completed Mar. 12, 2017, 4 pages.

Bradley Hope et al., "A Bitcoin Technology Gets Nasdaq Test"; May 10, 2015; retrieved from http://www.wsj.com/articles/a-bitcoin-technology-gets-nasdaq-test-1431296886.

Nathaniel Popper, "Bitcoin Technology Piques Interest on Wall Street"; Aug. 28, 2015 retrieved from http://www.nytimes.com/2015/08/31/business/dealbook/bitcoin-techno, Aug. 31, 2015.

Joseph C. Guagliardo et al., "Blockchain: Preparing for Disruption Like It's the '90s": Mar. 14. 2016, retrieved from http://www.law360.com/articles/77120CVprint?section=ip.

Richard Lee Twesige, "A simple explanation of Bitcoin and Blockchain technology"; Jan. 2015, retrieved from http://www.researchgate.net/profile/Richard_Twesige/publication/270287317_Bitcoin_A_simple_explanation_of_Bitcoin_and_Block_Chain_teohnology_January_2015_.

Robert Mcmillian, "IBM Bets on Bitcoin Ledger"; Feb. 16, 2016, retrieved from http://www.wsj.com/articles/ibm-bets-on-bitcoin-ledger-1455598884.

* cited by examiner

SYSTEM TO ENABLE CONTACTLESS ACCESS TO A TRANSACTION TERMINAL USING A PROCESS DATA NETWORK

CROSS-REFERENCE TO RELATED APPLICATIONS

This application is a continuation of patent application Ser. No. 15/050,307, filed Feb. 22, 2016, now publication No. 2017/0243213, published Aug. 24, 2017, and titled "SYSTEM TO ENABLE CONTACTLESS ACCESS TO A TRANSACTION TERMINAL USING A PROCESS DATA NETWORK", the entire disclosure of which is hereby incorporated herein by reference.

BACKGROUND

The introduction of contactless technology has become an important event for most industries. Contactless transfer of resources are already providing benefits to consumers and retailers alike, in terms of higher levels of control and convenience for consumers and higher throughput for retailers. While applications for contactless transfer of resources include various measures specifically designed to protect the security of the consumer's information, there is a need for a system to enable contactless access to a transaction terminal using a process data network thereby reducing overhead and decreasing the processing time associated with authentication.

BRIEF SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system operatively connected with a block chain distributed network and for using the block chain distributed network to enable contactless access to a transaction terminal using a process data network is presented. The system comprising: a memory device storing logic and rules for the block chain; and a processing device operatively coupled to the memory device, wherein the processing device is configured to execute computer-readable program code to: electronically receive from a transfer terminal, an indication that a user is accessing the transaction terminal using a user device; retrieve, from the user device, a unique identifier associated with the user device, wherein the unique identifier reflects one or more authentication credentials associated with the user, wherein the one or more authentication credentials comprises a private key associated with one or more financial institution accounts of the user; access a distributed ledger stored in the memory device, wherein the distributed ledger comprises a current state, wherein the current state encoded cryptographically using a hash chain of information associated with the one or more financial institution accounts of the user, wherein the distributed ledger is updated based on communications from a block chain distributed network, wherein the distributed ledger comprises one or more validated authentication credentials associated with the user and indicating at least an evolution of digital authentication associated with the user; compare, at an originating node, the unique identifier received from the user device with the one or more validated authentication credentials stored in the distributed ledger to determine whether the unique identifier meets a condition associated with the distributed ledger, wherein the condition comprises at least (i) determining a match between the unique identifier and at least one of the one or more validated authentication credentials stored in the distributed ledger, and (ii) determining a match between the unique identifier and the hash chain of information associated with the one or more financial institution accounts of the user; authorize the user device to access the transaction terminal based on at least determining the match between the unique identifier and at least one of the one or more validated authentication credentials stored in the distributed ledger and/or the match between the unique identifier and the hash chain of information associated with the one or more financial institution accounts of the user; receive, from the user, one or more additional authentication credentials associated with the user in addition to the unique identifier; determine that at least one of the one or more additional authentication credentials meets a condition associated with the block chain, thereby verifying the identity of the user; update the block chain of authentication information with the one or more additional authentication credentials based on at least verifying the identity of the user; transmit a request to one or more sources to validate the one or more additional authentication credentials and the unique identifier based on the logic and rules for the block chain; initiate, using one or more computing devices associated with the one or more sources, a block chain validation process to validate the one or more additional authentication credentials and the unique identifier based on at least a smart contract logic associated with the originating node and agreed upon by the one or more sources; receive an indication that the one or more additional authentication credentials and the unique identifier has been validated; and store the one or more additional authentication credentials and the unique identifier on the distributed ledger based on at least receiving the indication that the one or more authentication credentials and the unique identifier has been validated.

In some embodiments, the processing device is configured to execute computer-readable program code further to: determine a percentage score based on at least comparing between the unique identifier with the one or more validated authentication credentials associated with the user.

In some embodiments, the processing device is configured to execute computer-readable program code further to: determine one or more functions that the user wishes to execute by accessing the transaction terminal; determine whether the percentage score meets a matching requirement associated with the one or more functions that the user wishes to execute; and enable the user to execute the one or more functions based on at least determining that the percentage score meets the matching requirement.

In some embodiments, the processing device is configured to execute computer-readable program code further to: receive a request from the one or more computing devices associated with the one or more sources to access the distributed ledger; determine that the one or more computing devices associated with the one or more sources has authorized access to the distributed ledger; and authorize the one or more computing devices associated with the one or more sources to access the distributed ledger.

In some embodiments, the processing device is configured to execute computer-readable program code further to:

receive one or more authentication credentials from the one or more computing devices associated with the one or more sources; validate the one or more authentication credentials; and authorize the one or more sources to access the distributed ledger in response to validating the one or more authentication credentials.

In some embodiments, the wherein the processing device is configured to execute computer-readable program code further to: receive an indication that the one or more additional authentication credentials has been validated; and store the one or more additional authentication credentials on the distributed ledger based on at least receiving the indication that the unique identifier has been validated.

In another aspect, a computerized method using the block chain distributed network to enable contactless access to a transaction terminal using a process data network is presented. The method comprising: electronically receiving, using a computing device processor, from a transfer terminal, an indication that a user is accessing the transaction terminal using a user device; retrieving, using a computing device processor, from the user device, a unique identifier associated with the user device, wherein the unique identifier reflects one or more authentication credentials associated with the user, wherein the one or more authentication credentials comprises a private key associated with one or more financial institution accounts of the user; accessing, using a computing device processor, a distributed ledger stored in a memory device, wherein the distributed ledger comprises a current state, wherein the current state encoded cryptographically using a hash chain of information associated with the one or more financial institution accounts of the user, wherein the distributed ledger is updated based on communications from a block chain distributed network, wherein the distributed ledger comprises one or more validated authentication credentials associated with the user and indicating at least an evolution of digital authentication associated with the user; comparing, using a computing device processor, at an originating node, the unique identifier received from the user device with the one or more validated authentication credentials stored in the distributed ledger to determine whether the unique identifier meets a condition associated with the distributed ledger, wherein the condition comprises at least (i) determining a match between the unique identifier and at least one of the one or more validated authentication credentials stored in the distributed ledger, and (ii) determining a match between the unique identifier and the hash chain of information associated with the one or more financial institution accounts of the user; authorizing, using a computing device processor, the user device to access the transaction terminal based on at least determining the match between the unique identifier and at least one of the one or more validated authentication credentials stored in the distributed ledger and/or the match between the unique identifier and the hash chain of information associated with the one or more financial institution accounts of the user; receiving, using a computing device processor, from the user, one or more additional authentication credentials associated with the user in addition to the unique identifier; determining, using a computing device processor, that at least one of the one or more additional authentication credentials meets a condition associated with the block chain, thereby verifying the identity of the user; updating, using a computing device processor, the block chain of authentication information with the one or more additional authentication credentials based on at least verifying the identity of the user; transmitting, using a computing device processor, a request to one or more sources to validate the one or more additional authentication credentials and the unique identifier based on logic and rules for the block chain; initiating, using one or more computing devices associated with the one or more sources, a block chain validation process to validate the one or more additional authentication credentials and the unique identifier based on at least a smart contract logic associated with the originating node and agreed upon by the one or more sources; receiving, using a computing device processor, an indication that the one or more additional authentication credentials and the unique identifier has been validated; and storing, using a computing device processor, the one or more additional authentication credentials and the unique identifier on the distributed ledger based on at least receiving the indication that the one or more authentication credentials and the unique identifier has been validated.

In yet another aspect, a computer program product for execution on a system operatively connected with the block chain distributed network is presented. The computer program product for using the block chain distributed network using the block chain distributed network to enable contactless access to a transaction terminal using a process data network, the computer program product comprising at least one non-transitory computer-readable medium having computer-readable program code portions embodied therein, the computer-readable program code portions causing a first apparatus to: electronically receive from a transfer terminal, an indication that a user is accessing the transaction terminal using a user device; retrieve, from the user device, a unique identifier associated with the user device, wherein the unique identifier reflects one or more authentication credentials associated with the user, wherein the one or more authentication credentials comprises a private key associated with one or more financial institution accounts of the user; access a distributed ledger stored in the memory device, wherein the distributed ledger comprises a current state, wherein the current state encoded cryptographically using a hash chain of information associated with the one or more financial institution accounts of the user, wherein the distributed ledger is updated based on communications from a block chain distributed network, wherein the distributed ledger comprises one or more validated authentication credentials associated with the user and indicating at least an evolution of digital authentication associated with the user; compare, at an originating node, the unique identifier received from the user device with the one or more validated authentication credentials stored in the distributed ledger to determine whether the unique identifier meets a condition associated with the distributed ledger, wherein the condition comprises at least (i) determining a match between the unique identifier and at least one of the one or more validated authentication credentials stored in the distributed ledger, and (ii) determining a match between the unique identifier and the hash chain of information associated with the one or more financial institution accounts of the user; authorize the user device to access the transaction terminal based on at least determining the match between the unique identifier and at least one of the one or more validated authentication credentials stored in the distributed ledger and/or the match between the unique identifier and the hash chain of information associated with the one or more financial institution accounts of the user; receive, from the user, one or more additional authentication credentials associated with the user in addition to the unique identifier; determine that at least one of the one or more additional authentication credentials meets a condition associated with the block chain, thereby verifying the identity of the user; update the block chain of authentication information with the one or more additional authentication credentials based on at least verifying the identity of the user; transmit a request to one or more sources to validate the one or more additional authentication credentials and the unique identifier based on logic and rules for the block chain; initiate, using one or more computing devices associated with the one or more sources, a block chain validation process to validate the one or more additional authentication credentials and the unique identifier based on at least a smart contract logic associated with the originating node and agreed upon by the one or more sources; receive an indication that the one or more additional authentication credentials and the unique identifier has been validated; and store the one or more additional authentication credentials and the unique identifier on the distributed ledger based on at least receiving the indication that the one or more authentication credentials and the unique identifier has been validated.

BRIEF DESCRIPTION OF THE DRAWINGS

Figure 1:
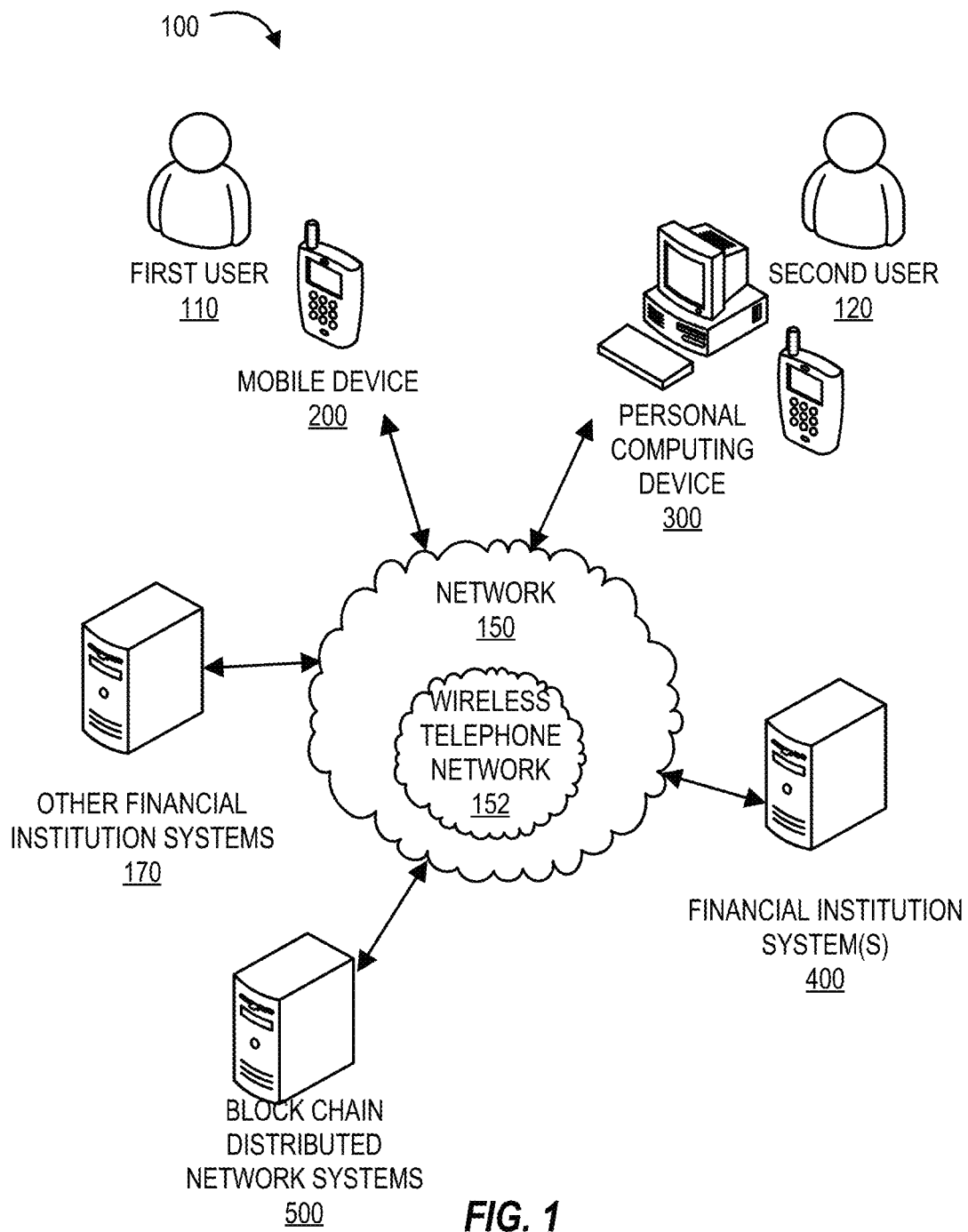
Figure 2:
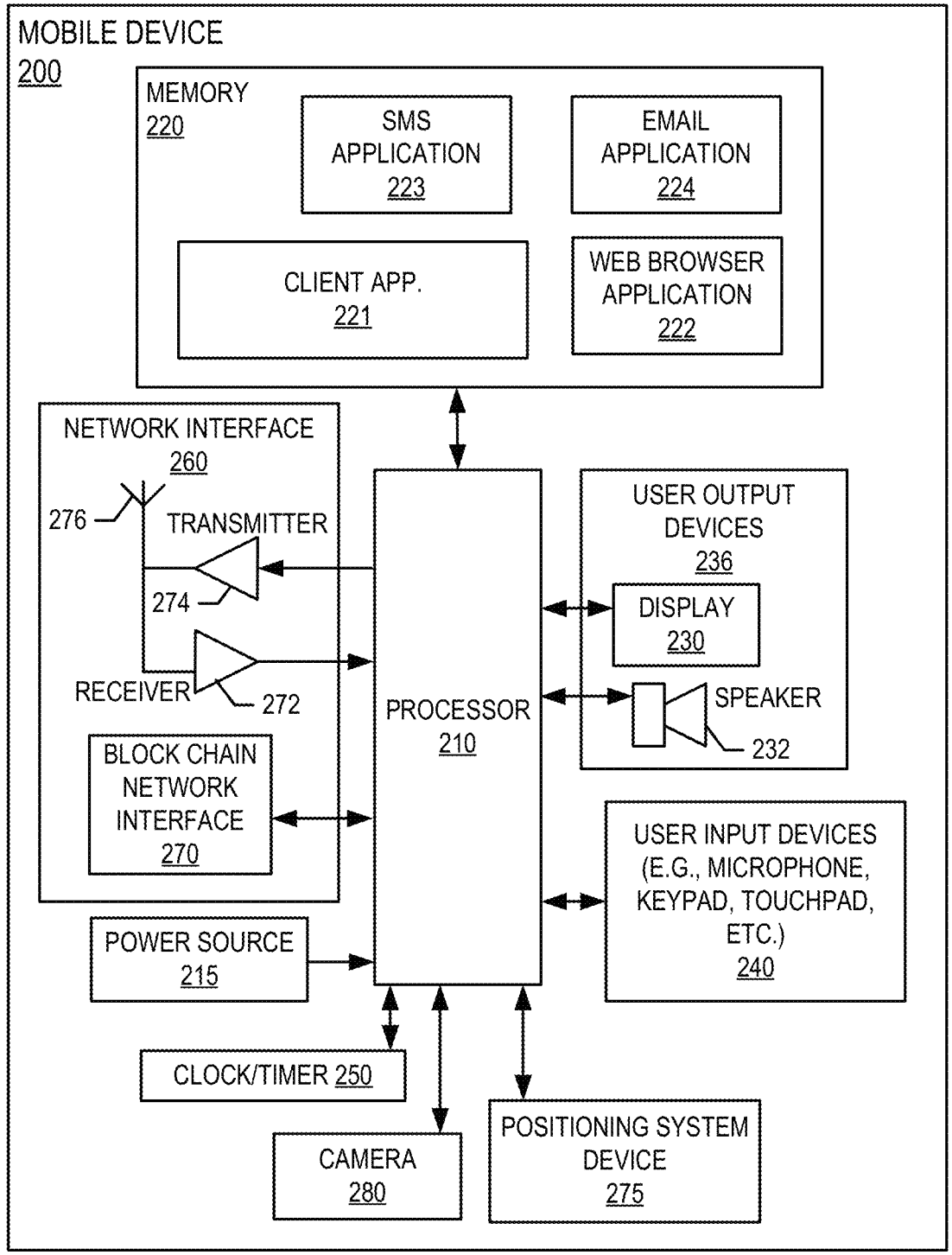
Figure 3:
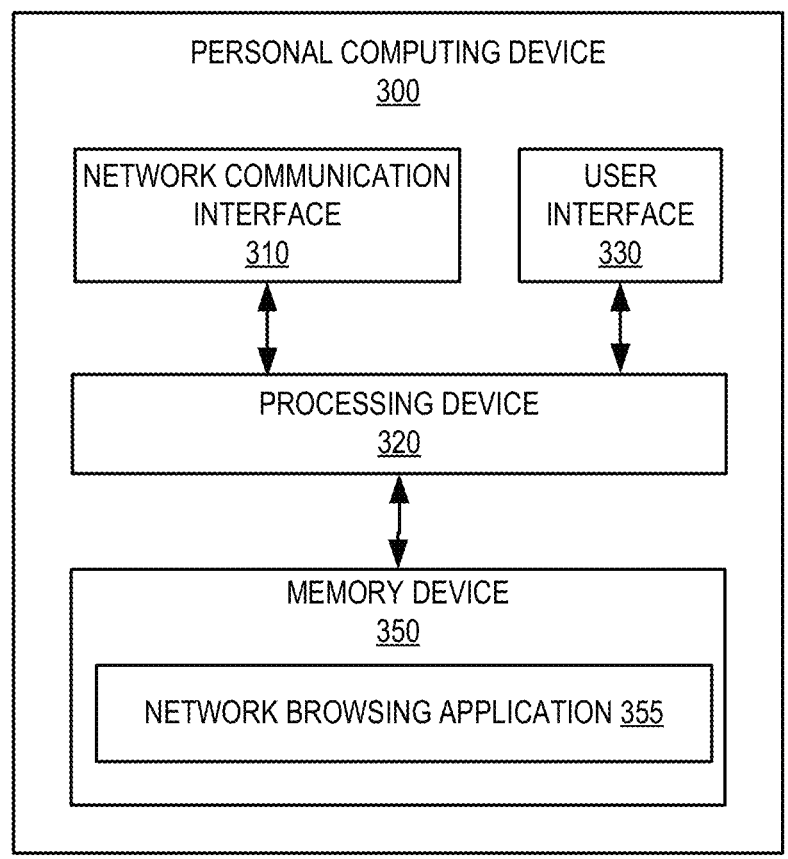
Figure 4:
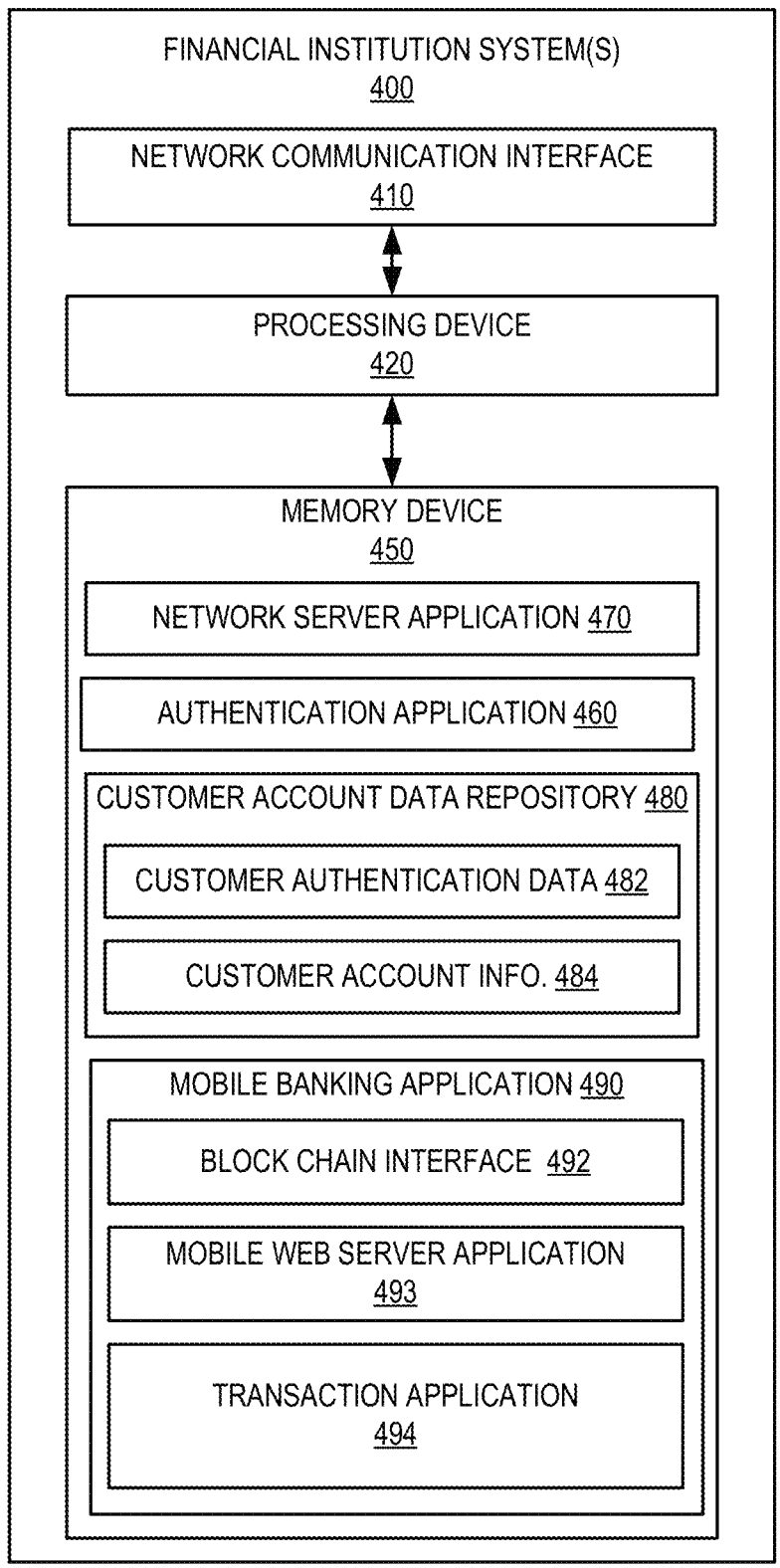
Figure 5:
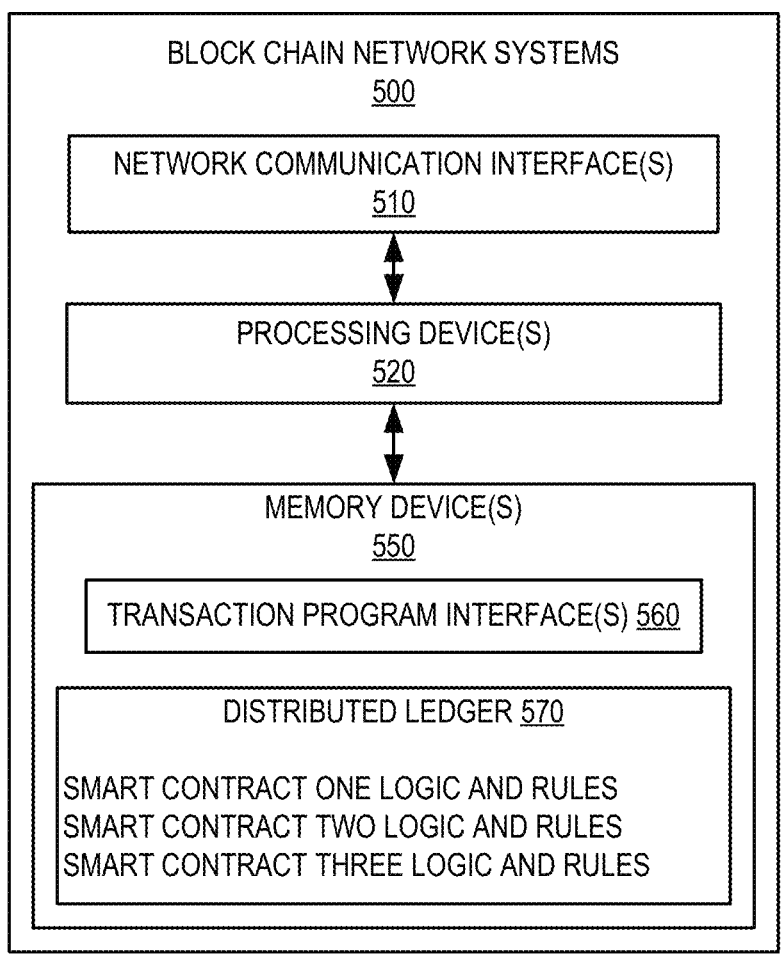
Figure 6A:
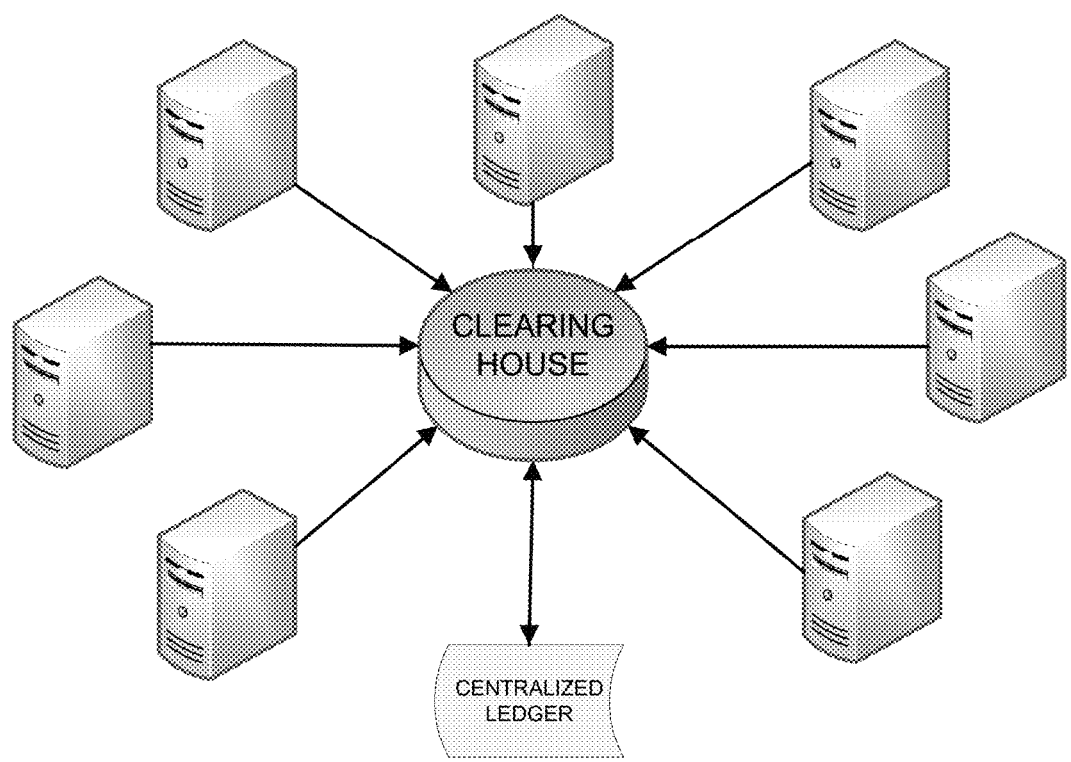
Figure 6B:
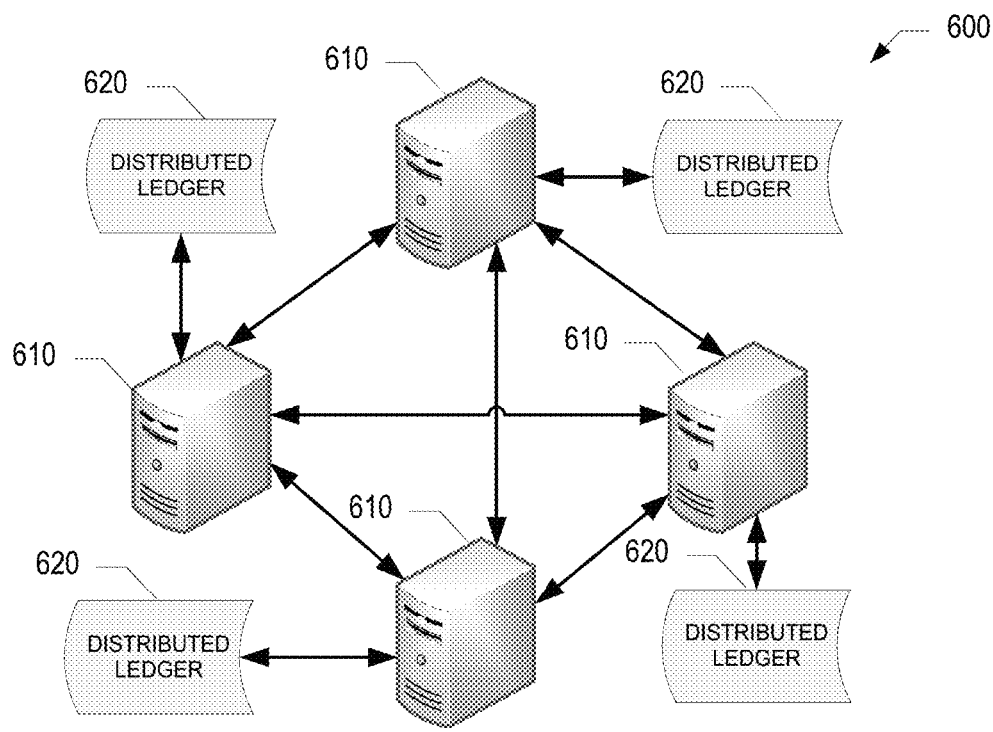
Figure 7:
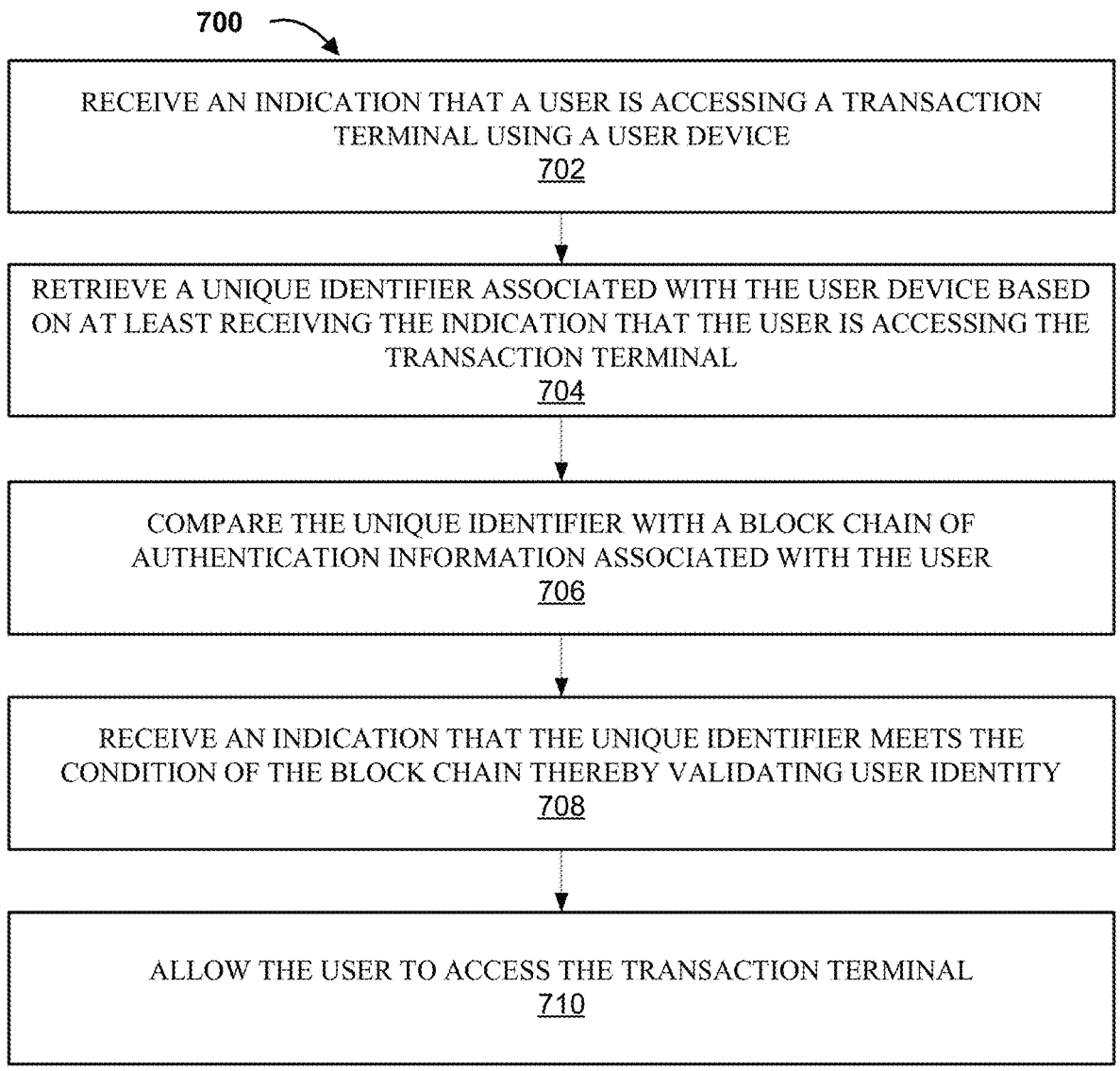

Having thus described embodiments of the invention in general terms, reference will now be made to the accompanying drawings, where:

FIG. 1 provides a block diagram illustrating a smart contract block chain system environment for control of device identity and usage in a process data network, in accordance with embodiments of the invention;

FIG. 2 provides a block diagram illustrating the first user's mobile computing device of FIG. 1, in accordance with embodiments of the invention;

FIG. 3 provides a block diagram illustrating the second user's personal computing device of FIG. 1, in accordance with embodiments of the invention;

FIG. 4 provides a block diagram illustrating the financial institution system(s) of FIG. 1, in accordance with embodiments of the invention;

FIG. 5 provides a block diagram illustrating the block chain network systems of FIG. 1, in accordance with embodiments of the invention;

FIG. 6A is a diagram illustrating a centralized clearinghouse network configuration, in accordance with embodiments of the invention;

FIG. 6B is a diagram illustrating a decentralized block chain network configuration, in accordance with embodiments of the invention; and FIG. 7 illustrates a process flow to enable contactless access to a transaction terminal using a process data network, in accordance with embodiments of the invention.

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

FIG. 1 provides a block diagram illustrating a smart contract block chain system and environment for control of device identity and usage in a process data network 100, in accordance with an embodiment of the invention. As illustrated in FIG. 1, the environment 100 includes a first user 110 and/or a second user 120 where the users represent customers of one or more financial institution(s). A user of the system may be a person, but may also be a business (e.g., a merchant) or any other entity. For purposes of the invention, the term "user", and "customer" may be used interchangeably.

The environment 100 also may include a mobile device 200 and a personal computing device 300 for use by the first user 110 and second user 120, respectively. The personal computing device 300 may be any device that employs a processor and memory and can perform computing functions, such as a personal computer or a mobile device. As used herein, a "mobile device" 200 is any mobile communication device, such as a cellular telecommunications device (i.e., a cell phone or mobile phone), personal digital assistant (PDA), a mobile Internet accessing device, or other mobile device.

The mobile device 200 and the personal computing device 300 are configured to communicate over a network 150 with a financial institution system(s) 400 and, in some cases, one or more other financial institution systems 170 and with the blockchain, as represented by the block chain distributed network systems 500. The first user's mobile device 200, the second user's personal computing device 300, the financial institution system(s) 400, the block chain distributed network systems 500, and any other participating financial institution systems 170 are each described in greater detail below with reference to FIGS. 2-5. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In one embodiment, the network 150 includes a wireless telephone network 152.

In general, a mobile device 200 is configured to connect with the network 150 to log the first user 110 into a block chain interface 492 of the financial institution system(s) 400 and/or the block chain distributed network systems 500 (i.e., "block chain systems 500). A user, in order to access the first user's account(s), online banking application and/or mobile banking application on the financial institution system(s) 400 must authenticate with the financial institution system(s) 400 and/or another system. Similarly, in some embodiments, in order to access the distributed ledger(s) of the block chain systems 500, a user must authenticate with the financial institution system(s) 400 and/or another system, such as one of the block chain systems 500. For example, logging into the financial institution system(s) 400 generally requires that the first user 110 authenticate his/her identity using a user name, a passcode, a cookie, a biometric identifier, a private key, a token, and/or another authentication mechanism that is provided by the first user 110 to the financial institution system(s) 400 via the mobile device 200.

The financial institution system(s) 400 are in network communication with other devices, such as other financial institutions' transaction/banking systems 170, block chain systems 500, and a personal computing device 300 that is configured to communicate with the network 150 to log a second user 120 into the financial institution system(s) 400. In one embodiment, the invention may provide an application download server such that software applications that support the financial institution system(s) 400 can be downloaded to the mobile device 200.

In some embodiments of the invention, the application download server is configured to be controlled and managed by one or more third-party data providers (not shown in FIG. 1) over the network 150. In other embodiments, the application download server is configured to be controlled and managed over the network 150 by the same entity or entities that maintains the financial institution system(s) 400.

In some embodiments of the invention, the block chain systems 500 are configured to be controlled and managed by one or more third-party data providers (not shown), financial institutions or other entities over the network 150. In other embodiments, the block chain systems 500 are configured to be controlled and managed over the network 150 by the same entity that maintains the financial institution system(s) 400.

FIG. 2 provides a block diagram illustrating a user's mobile device 200 of FIG. 1 in more detail, in accordance with embodiments of the invention. In one embodiment of the invention, the mobile device 200 is a mobile telephone. However, it should be understood that a mobile telephone is merely illustrative of one type of mobile device 200 that may benefit from, employ, or otherwise be involved with embodiments of the present invention and, therefore, should not be taken to limit the scope of embodiments of the present invention. Other types of mobile devices 200 may include portable digital assistants (PDAs), pagers, mobile televisions, gaming devices, laptop computers, cameras, video recorders, audio/video player, radio, GPS devices, or any combination of the aforementioned.

Some embodiments of the mobile device 200 include a processor 210 communicably coupled to such devices as a memory 220, user output devices 236, user input devices 240, a network interface 260, a power source 215, a clock or other timer 250, a camera 280, and a positioning system device 275. The processor 210, and other processors described herein, generally include circuitry for implementing communication and/or logic functions of the mobile device 200. For example, the processor 210 may include a digital signal processor device, a microprocessor device, and various analog to digital converters, digital to analog converters, and/or other support circuits. Control and signal processing functions of the mobile device 200 are allocated between these devices according to their respective capabilities. The processor 210 thus may also include the functionality to encode and interleave messages and data prior to modulation and transmission. The processor 210 can additionally include an internal data modem. Further, the processor 210 may include functionality to operate one or more software programs, which may be stored in the memory 220. For example, the processor 210 may be capable of operating a connectivity program, such as a web browser application 222. The web browser application 222 may then allow the mobile device 200 to transmit and receive web content, such as, for example, location-based content and/or other web page content, according to a Wireless Application Protocol (WAP), Hypertext Transfer Protocol (HTTP), and/or the like.

The processor 210 is configured to use the network interface 260 to communicate with one or more other devices on the network 150. In this regard, the network interface 260 includes an antenna 276 operatively coupled to a transmitter 274 and a receiver 272 (together a "transceiver"). The processor 210 is configured to provide signals to and receive signals from the transmitter 274 and receiver 272, respectively. The signals may include signaling information in accordance with the air interface standard of the applicable cellular system of the wireless telephone network 152. In this regard, the mobile device 200 may be configured to operate with one or more air interface standards, communication protocols, modulation types, and access types. By way of illustration, the mobile device 200 may be configured to operate in accordance with any of a number of first, second, third, and/or fourth-generation communication protocols and/or the like. For example, the mobile device 200 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 3GPP protocols and/or the like. The mobile device 200 may also be configured to operate in accordance with non-cellular communication mechanisms, such as via a wireless local area network (WLAN) or other communication/data networks.

The network interface 260 may also include a block chain network interface 270. The block chain network interface 270 may include software, such as encryption software, and hardware, such as a modem, for communicating information to and/or from one or more devices on a network 150 and connected with or that are part of the block chain systems 500. For example, the mobile device may 200 wirelessly communicate encrypted activity information to a terminal of the network 150 or the block chain systems 500.

As described above, the mobile device 200 has a user interface that is, like other user interfaces described herein, made up of user output devices 236 and/or user input devices 240. The user output devices 236 include a display 230 (e.g., a liquid crystal display or the like) and a speaker 232 or other audio device, which are operatively coupled to the processor 210. The user input devices 240, which allow the mobile device 200 to receive data from a user such as the first user 110, may include any of a number of devices allowing the mobile device 200 to receive data from a user, such as a keypad, keyboard, touch-screen, touchpad, microphone, mouse, joystick, other pointer device, button, soft key, and/or other input device(s). The user interface may also include a camera 280, such as a digital camera.

The mobile device 200 may also include a positioning system device 275 that is configured to be used by a positioning system to determine a location of the mobile device 200. For example, the positioning system device 275 may include a GPS transceiver. In some embodiments, the positioning system device 275 is at least partially made up of the antenna 276, transmitter 274, and receiver 272 described above. For example, in one embodiment, triangulation of cellular signals may be used to identify the approximate location of the mobile device 200. In other embodiments, the positioning system device 275 includes a proximity sensor or transmitter, such as an RFID tag, that can sense or be sensed by devices known to be located proximate a merchant or other location to determine that the mobile device 200 is located proximate these known devices. Such information may be used by embodiments of the invention in order to demonstrate completion or partial completion of one or more activities associated with a smart contract.

The mobile device 200 further includes a power source 215, such as a battery, for powering various circuits and other devices that are used to operate the mobile device 200. Embodiments of the mobile device 200 may also include a clock or other timer 250 configured to determine and, in some cases, communicate actual or relative time to the processor 210 or one or more other devices.

The mobile device 200 also includes a memory 220 operatively coupled to the processor 210. As used herein, memory includes any computer readable medium (as defined herein below) configured to store data, code, or other information. The memory 220 may include volatile memory, such as volatile Random Access Memory (RAM) including a cache area for the temporary storage of data. The memory 220 may also include non-volatile memory, which can be embedded and/or may be removable. The non-volatile memory can additionally or alternatively include an electrically erasable programmable read-only memory (EEPROM), flash memory or the like.

The memory 220 can store any of a number of applications which comprise computer-executable instructions/code executed by the processor 210 to implement the functions of the mobile device 200 and/or one or more of the process/method steps described herein. For example, the memory 220 may include such applications as a conventional web browser application 222 and/or a client application 221. These applications also typically provide a graphical user interface (GUI) on the display 230 that allows the first user 110 to communicate with the mobile device 200, the financial institution system(s) 400, and/or other devices or systems. In one embodiment of the invention, when the first user 110 decides to enroll in the transaction program, the first user 110 downloads or otherwise obtains the client application 221 from the financial institution system(s) 400, from the block chain systems 500 or from a distinct application server. In other embodiments of the invention, the first user 110 interacts with the financial institution system(s) 400 or the block chain systems 500 via the web browser application 222 in addition to, or instead of, the client application 221.

The memory 220 can also store any of a number of pieces of information, and data, used by the mobile device 200 and the applications and devices that make up the mobile device 200 or are in communication with the mobile device 200 to implement the functions of the mobile device 200 and/or the other systems described herein. For example, the memory 220 may include such data as user authentication information, etc.

Referring now to FIG. 3, the personal computing device 300 associated with the second user 120 also includes various features, such as a network communication interface 310, a processing device 320, a user interface 330, and a memory device 350. The network communication interface 310 includes a device that allows the personal computing device 300 to communicate over the network 150 (shown in FIG. 1). In one embodiment of the invention, a network browsing application 355 provides for a user to establish network communication with a financial institution system(s) 400 and/or the block chain systems 500 (shown in FIG. 1) for the purpose of initiating enrollment in the transaction program, interacting with a device transaction interface, inputting data indicative of actions associated with one or more smart contracts and/or managing transactions, in accordance with embodiments of the invention.

As used herein, "smart contracts" are computer processes that facilitate, verify and/or enforce negotiation and/or performance of a contract between parties. One fundamental purpose of smart contracts is to integrate the practice of contract law and related business practices with electronic commerce protocols between people on the Internet. Smart contracts may leverage a user interface that provides one or more parties or administrators access, which may be restricted at varying levels for different people, to the terms and logic of the contract. Smart contracts typically include logic that emulates contractual clauses that are partially or fully self-executing and/or self-enforcing. Examples of smart contracts are digital rights management (DRM) used for protecting copyrighted works, financial cryptography schemes for financial contracts, admission control schemes, token bucket algorithms, other quality of service mechanisms for assistance in facilitating network service level agreements, person-to-person network mechanisms for ensuring fair contributions of users, and others.

Smart contract infrastructure can be implemented by replicated asset registries and contract execution using cryptographic hash chains and Byzantine fault tolerant replication. For example, each node in a peer-to-peer network or blockchain distributed network may act as a title registry and escrow, thereby executing changes of ownership and implementing sets of predetermined rules that govern transactions on the network. Each node may also check the work of other nodes and in some cases, as noted above, function as miners or validators. In some embodiments, the nodes in the block chain maybe entity such as financial institutions that function as gateways for other entities.

As used herein, "transaction information" may include both monetary and non-monetary transaction information and records. Non-monetary transaction information or records means historical transaction information such as account balances, account activity, misappropriation activity, purchase activity, payment activity and the like and is distinguished from the underlying monetary transactions such as settling of accounts, payments, debits, credits, fund transfers and the like.

As used herein, a "processing device," such as the processing device 320, generally refers to a device or combination of devices having circuitry used for implementing the communication and/or logic functions of a particular system. For example, a processing device 320 may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 320 may further include functionality to operate one or more software programs based on computer-executable program code thereof, which may be stored in a memory. As the phrase is used herein, a processing device 320 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "user interface" 330 generally includes a plurality of interface devices and/or software that allow a customer to input commands and data to direct the processing device to execute instructions. For example, the user interface 330 presented in FIG. 3 may include a graphical user interface (GUI) or an interface to input computer-executable instructions that direct the processing device 320 to carry out specific functions. The user interface 330 employs certain input and output devices to input data received from the first user 110 or second user 120 or output data to the first user 110 or second user 120. These input and output devices may include a display, mouse, keyboard, button, touchpad, touch screen, microphone, speaker, LED, light, joystick, switch, buzzer, bell, and/or other customer input/output device for communicating with one or more customers.

As used herein, a "memory device" 350 generally refers to a device or combination of devices that store one or more forms of computer-readable media for storing data and/or computer-executable program code/instructions. Computer-readable media is defined in greater detail below. For example, in one embodiment, the memory device 350 includes any computer memory that provides an actual or virtual space to temporarily or permanently store data and/or commands provided to the processing device 320 when it carries out its functions described herein.

FIG. 4 provides a block diagram illustrating the financial institution system(s) 400, in greater detail, in accordance with embodiments of the invention. As illustrated in FIG. 4, in one embodiment of the invention, the financial institution system(s) 400 include one or more processing devices 420 operatively coupled to a network communication interface 410 and a memory device 450. In certain embodiments, the financial institution system(s) 400 are operated by a first entity, such as a financial institution, while in other embodiments, the financial institution system(s) 400 are operated by an entity other than a financial institution.

It should be understood that the memory device 450 may include one or more databases or other data structures/repositories. The memory device 450 also includes computer-executable program code that instructs the processing device 420 to operate the network communication interface 410 to perform certain communication functions of the financial institution system(s) 400 described herein. For example, in one embodiment of the financial institution system(s) 400, the memory device 450 includes, but is not limited to, a network server application 470, an authentication application 460, a customer account data repository 480 which includes customer authentication data 480 and customer account information 484, a mobile banking application 490 which includes a block chain interface 492, a mobile web server application 493, a downloadable transaction application 494 and other computer-executable instructions or other data. The computer-executable program code of the network server application 470, the authentication application 460, or the mobile banking application 490 may instruct the processing device 420 to perform certain logic, data-processing, and data-storing functions of the financial institution system(s) 400 described herein, as well as communication functions of the financial institution system(s) 400.

In one embodiment, the customer account data repository 480 includes customer authentication data 482 and customer account information 484. The network server application 470, the authentication application 460, and the mobile banking application 490 are configured to invoke or use the customer account information 484, the customer authentication data 482, and the block chain interface 492 when authenticating a user to the financial institution system(s) 400 and/or the block chain systems 500.

As used herein, a "communication interface" generally includes a modem, server, transceiver, and/or other device for communicating with other devices on a network, and/or a user interface for communicating with one or more customers. Referring again to FIG. 4, the network communication interface 410 is a communication interface having one or more communication devices configured to communicate with one or more other devices on the network 450, such as the mobile device 200, the personal computing device 300, the other financial institution banking systems 170, and the block chain systems 500. The processing device 420 is configured to use the network communication interface 410 to transmit and/or receive data and/or commands to and/or from the other devices connected to the network 150.

FIG. 5 provides a block diagram illustrating block chain network systems 500, in accordance with embodiments of the invention. As discussed with reference to FIG. 6B below, embodiments of the block chain may include multiple systems, servers, computers or the like maintained by one or many entities. FIG. 5 merely illustrates one of those systems that, typically, interacts with many other similar systems to form the block chain. In one embodiment of the invention, the block chain network systems 500 are operated by a second entity that is a different or separate entity from the first entity (e.g., the financial institution) that, in one embodiment of the invention, implements the financial institution system(s) 400. In some embodiments, the financial institution system(s) 400 are part of the block chain. Similarly, in some embodiments, the block chain network systems 500 are part of the financial institution system(s) 400. In other embodiments, the financial institution system(s) 400 are distinct from the block chain network systems 500.

As illustrated in FIG. 5, the one of the block chain network systems 500 generally includes, but is not limited to, a network communication interface 510, a processing device 520, and a memory device 550. The processing device 520 is operatively coupled to the network communication interface 510 and the memory device 550. In one embodiment of the block chain network systems 500, the memory device 550 stores, but is not limited to, a transaction program interface 560 and a distributed ledger 570. In some embodiments, the distributed ledger 570 stores data including, but not limited to, smart contract logic and rules, such as a first smart contract, its associated logic and rules, a second smart contract, its associated logic and rules, a third smart contract, its associated logic and rules, etc. In one embodiment of the invention, both the transaction program interface 560 and the distributed ledger 570 may associate with applications having computer-executable program code that instructs the processing device 520 to operate the network communication interface 510 to perform certain communication functions involving the distributed ledger 570 described herein. In one embodiment, the computer-executable program code of an application associated with the distributed ledger 570 may also instruct the processing device 520 to perform certain logic, data processing, and data storing functions of the application associated with the distributed ledger 570 described herein.

The network communication interface 510 is a communication interface having one or more communication devices configured to communicate with one or more other devices on the network 150. The processing device 520 is configured to use the network communication interface 510 to receive information from and/or provide information and commands to a mobile device 200, a personal computing device 300, other financial institution systems 170, other block chain network systems 500, the financial institution system(s) 400 and/or other devices via the network 150. In some embodiments, the processing device 520 also uses the network communication interface 510 to access other devices on the network 150, such as one or more web servers of one or more third-party data providers. In some embodiments, one or more of the devices described herein may be operated by a second entity so that the second entity controls the various functions involving the block chain network systems 500. For example, in one embodiment of the invention, although the financial institution system(s) 400 are operated by a first entity (e.g., a financial institution), a second entity operates one or more of the block chain network systems 500 that store various copies of the distributed ledger 570.

As described above, the processing device 520 is configured to use the network communication interface 510 to gather data, such as data corresponding to transactions, blocks or other updates to the distributed ledger 570 from various data sources such as other block chain network systems 500. The processing device 520 stores the data that it receives in its copy of the distributed ledger 570 stored in the memory device 550.

As discussed above, in some embodiments of the invention, an application server or application download server (not shown) might be provided. The application download server may include a network communication interface, a processing device, and a memory device. The network communication interface and processing device are similar to the previously described network communication interface 410 and the processing device 420 previously described. For example, the processing device is operatively coupled to the network communication interface and the memory device. In one embodiment of the application download server, the memory device includes a network browsing application having computer-executable program code that instructs the processing device to operate the network communication interface to perform certain communication functions of the application download server described herein. In some embodiments of the invention, the application download server provides applications that are to be downloaded to a qualified user's mobile device or personal computing device.

Rather than utilizing a centralized database of aliases as discussed with reference to some embodiments above and as shown in FIG. 6A, other various embodiments of the invention may use a decentralized block chain configuration or architecture as shown in FIG. 6B in order to facilitate a transaction management program using smart contracts distributed on a block chain distributed network. Such a decentralized block chain configuration ensures accurate mapping of smart contracts to financial institutions and/or customers. Accordingly, a block chain configuration may be used to maintain an accurate ledger of smart contract and/or transaction records and to provide validation of transactions involving those smart contracts.

A block chain or blockchain is a distributed database that maintains a list of data records, the security of which is enhanced by the distributed nature of the block chain. A block chain typically includes several nodes, which may be one or more systems, machines, computers, databases, data stores or the like operably connected with one another. In some cases, each of the nodes or multiple nodes are maintained by different entities. A block chain typically works without a central repository or single administrator. One well-known application of a block chain is the public ledger of transactions for cryptocurrencies such as used in bitcoin. The data records recorded in the block chain are enforced cryptographically and stored on the nodes of the block chain.

A block chain provides numerous advantages over traditional databases. A large number of nodes of a block chain may reach a consensus regarding the validity of a transaction contained on the transaction ledger.

The block chain typically has two primary types of records. The first type is the transaction type, which consists of the actual data stored in the block chain. The second type is the block type, which are records that confirm when and in what sequence certain transactions became recorded as part of the block chain. Transactions are created by participants using the block chain in its normal course of business, for example, when someone sends cryptocurrency to another person), and blocks are created by users known as "miners" who use specialized software/equipment to create blocks. In some embodiments, the block chain system disclosed, SS the number of miners in the current system are known and the system comprises primary sponsors that generate and create the new blocks of the system. As such, any block may be worked on by a primary sponsor. Users of the block chain create transactions that are passed around to various nodes of the block chain. A "valid" transaction is one that can be validated based on a set of rules that are defined by the particular system implementing the block chain. For example, in the case of cryptocurrencies, a valid transaction is one that is digitally signed, spent from a valid digital wallet and, in some cases, that meets other criteria.

As mentioned above and referring to FIG. 6B, a block chain 600 is typically decentralized—meaning that a distributed ledger 620 (i.e., a decentralized ledger) is maintained on multiple nodes 610 of the block chain 600. One node in the block chain may have a complete or partial copy of the entire ledger or set of transactions and/or blocks on the block chain. Transactions are initiated at a node of a block chain and communicated to the various nodes of the block chain. Any of the nodes can validate a transaction, add the transaction to its copy of the block chain, and/or broadcast the transaction, its validation (in the form of a block) and/or other data to other nodes. This other data may include time-stamping, such as is used in cryptocurrency block chains. In some embodiments, the nodes of the system might be financial institutions that function as gateways for other financial institutions. For example, a credit union might hold the account, but access to the distributed system through a sponsor node.

Various other specific-purpose implementations of block chains have been developed. These include distributed domain name management, decentralized crowd-funding, synchronous/asynchronous communication, decentralized real-time ride sharing and even a general purpose deployment of decentralized applications. In some embodiments, a block chain may be characterized as a public block chain, a consortium block chain, or a private block chain. In this regard, the public block chain is a block chain that anyone in the world can read, anyone in the world can send transactions to and expect to see them included if they are valid, and anyone in the world can participate in the consensus process. The consensus process is a process for determining which of the blocks get added to the chain and what the current state each block is. Typically, public block chains are secured by crypto economics—the combination of economic and cryptographic verification using mechanisms such as proof of work, following a general principle that the degree to which someone can have an influence in the consensus process is proportional to the quantity of economic resources that they can bring to bear. A public block chain is generally considered to be fully decentralized.

In some embodiments, a consortium block chain is a block chain where the consensus process is controlled by a pre-selected set of nodes; for example, a block chain may be associated with a number of member institutions (say 15), each of which operate in such a way that the at least 10 members must sign every block in order for the block to be valid. The right to read such a block chain may be public, or restricted to the participants. These block chains may be considered partially decentralized.

In still other embodiments, fully private block chains is a block chain whereby permissions are kept centralized with one entity. The permissions may be public or restricted to an arbitrary extent.

Financial institutions have implemented payment services such as mobile payment, also referred to as mobile money, mobile money transfer, and mobile wallet that operate under financial regulation and are performed via a mobile device. Instead of paying with cash, check, or credit cards, the user can use the mobile device to pay for a wide range of services and digital or hard goods. Of the various models used in mobile payment, Near Field Communication (NFC) is used mostly in paying for purchases made in physical stores or transportation services. A user using a special mobile phone equipped with the smartcard may waive his/her phone near a reader module to execute the transaction after which a payment could be deducted from an associated financial institution account directly. Typically, such a transaction model requires that the mobile device store at least some information associated with the user's financial institution accounts to facilitate NFC based transactions. Or in cases where the financial information is stored in a cloud-based environment, axis information associated with the user's cloud account is stored on the mobile device. In some embodiments, in addition to storing the user's financial institution accounts, the mobile device may also store a unique identifier reflecting the user's identity. When a user attempts to access a transaction terminal using the mobile device via NFC, the financial institution associated with the transaction typically authenticates the user's identity prior to enabling the user to access one or more functions associated with the transaction terminal. Most financial institutions have individual proprietary verification algorithms to authenticate the identity of a user. While most identity verification algorithms have considerable overhead for the financial institutions when they attempt to verify the identity of their customers, excess overhead when a user's identity is to be verified across multiple proprietary platforms. In this regard, verifying a user's identity may increase computation time, memory, bandwidth, and other resources required to cross validate the user. The present invention provides the functional benefit of using a block chain configuration to verify the identity of the user within and across multiple proprietary platforms and provide contactless access to the user.

FIG. 7 illustrates a process flow for control of device identity and usage 700, in accordance with an embodiment of the invention. As shown in block 702, the process flow includes receiving an indication that a user is accessing a transaction terminal using a user device. Typically a transaction terminal may be a device which interfaces with payment cards to enable a user to execute transactions with a number of entities including but not limited to a financial institution, a merchant, one or more other users, or the like. Exemplary transactions include, but are not limited to: purchasing, renting, selling, and/or leasing one or more goods and/or services (e.g., merchandise, groceries, tickets, and the like); withdrawing cash; making deposits; making payments to creditors (e.g., paying bills, paying taxes, and the like); sending remittances; transferring funds; loading money onto stored value cards; and/or the like.

In some embodiments, the user may register his/her credit and debit cards into a secure wallet on the mobile device to enable the mobile device to be used in executed transaction. This wallet may be stored in the cloud, on the device or book. The user may then pay for products/services associated with a merchant by using the mobile device near the payment terminal. In some embodiments, the user may execute online purchases by authenticating themselves on the mobile device to the online mobile payment system. Typically, the point of sale terminal of the merchant must have a payment terminal that supports the required model of mobile device transaction (e.g., Near Field Communication). In this regard, NFC chips are built into the mobile device and allow communication with the point of sale terminal when the mobile device is proximate to the NFC-enabled point of sale terminal. In some embodiments, using the mobile device to execute the transaction may require one or more authentication credentials associated with the user to be verified for use in the execution of transactions. For example, the user may have to use a fingerprint or a Personal Identification Number (PIN) to authorize the transaction. In some other embodiments, using the mobile device to execute the transaction may not require any further authentication credentials beyond the credentials required from the user to access the mobile device.

Next, as shown in block 704, the process flow includes retrieving a unique identifier associated with the user device (e.g., mobile device associated with the user) based on at least receiving the indication that the user is accessing the transaction terminal. In some embodiments, the unique identifier reflects one or more authentication credentials associated with the user. Examples of authentication credentials include, but are not limited to, username, contact information, a password, a PIN number, biometric information (e.g., features such as fingerprints, finger vein and palm vein patterns, as well as iris and facial recognition to verify individual identities), a unique identification number associated with the user, social network information, an account number, or a card number. In some embodiments, the user information may be proprietary to the entity, such as an account number, a reference number to an account, a client number, or the like. In other embodiments, the user information may be public information, such as a phone number, mailing address, email address, or the like.

In response, the process flow includes comparing the unique identifier with a block chain of authentication information associated with the user, as shown in block 706. The unique identifiers typically a digital identity used by computer systems to represent the entity. The unique identifier may be associated with a person, an organization, an application, or a device. In other words, the unique identifier may be defined as a "set of attributes related to an entity". The block chain of authentication information may include one or more validated nodes, each node representing validated authentication credentials associated with the user. In this way, the authentication credentials associated with the user may be received from various sources to be added to the block chain and validated prior to being stored on the block chain. In doing so, the block chain of authentication information may include a record of the evolution of digital authentication associated with the user. By maintaining the block chain of authentication information, the system may be configured to receive authentication credentials of the user over a period of time and enabling the received authentication credentials to be validated by various sources (e.g. miners) prior to being placed on the block chain. For example, a user's authentication features such as a signature typically tends to change/involve over time. Usually, when signature is analyzed, most systems perform additional analysis by analyzing the strokes within the writing instead of the writing style as there are multiple reasons such as level of expression, time, and/or caregiving to the writing why a signature varies. However, by maintaining a block chain of authentication credentials (including a signature), the system may be configured to determine whether the unique identifier (in this case, a signature) meets the condition of the block chain. By comparing the unique identifier with the block chain of authentication information comprising one or more validated signatures executed by the user over time, the system may not be required to perform additional handwriting analysis to determine whether the signatures match. The system may merely compare the unique identifier with the block chain of authentication information to determine a match. In another example, most biometric analyses implement facial recognition as a method of authenticating user. By comparing the unique identifier (in this case, facial features) with the block chain of authentication information comprising one or more validated and identifiable user images, the system may be able to reduce the frequency of false identification and provide accurate authentication. In yet another example, a user's transaction information may also be used as a factor in authenticating the user's identity. Transaction information can be any information that identifies, defines, describes, and/or is otherwise associated with the transaction. Exemplary transaction information includes, but is not limited to, the party(ies) involved in the transaction, the date and/or time of the transaction, the account(s) involved in the transaction, the transaction amount(s) associated with the transaction, the good(s) and/or service(s) involved in the transaction, a description of the transaction (which, itself, can include any transaction information, e.g., the description may describe the transaction status, the goods and/or services involved in the transaction, and the like), and/or the like. In this regard, the system may be configured to compare the unique identifier (in this case, transaction information) meets a condition of the block chain. By comparing the unique identifier with the block chain of authentication information comprising a pattern of validated past transactions executed by the user, the system may be able to increase the accuracy of user authentication and reduce processing speed.

In some embodiments, the system may be configured to determine a percentage score based on at least comparing between the unique identifier reflecting one or more authentication credentials associated with the user and the block chain of authentication information associated with the user. In some embodiments, the percentage score may be correlated with the number of functions/features that the user may be authenticated to access. In this regard, the system may be configured to determine one or more functions that the user wishes to execute by accessing the transaction terminal. In response, the system may determine whether the percentage score meets a matching requirement associated with the one or more functions that the user wishes to execute and enable the user to execute the one or more functions based on at least determining that the percentage score meets the matching requirement.

Next, as shown in block 708, the process flow includes receiving an indication that the unique identifier meets the condition of the block chain thereby validating user identity. In response to receiving an indication that the unique identifier meets the condition of the block chain, and a percentage score associated with the comparison, the system may allow the user to access the transaction terminal, as shown in block 710.

In some embodiments, the user may access the transaction terminal to execute a transaction using one or more financial credentials. The financial credentials may include but is not limited to one or more debit or credit cards associated with one or more financial institution accounts of the user. In some other embodiments, the financial credentials may include a token (e.g., an alias, substitute, surrogate, or other like identifier) as a replacement for sensitive account information. Typically, tokens or portions of tokens may be used as a stand in for a user account number, user name, pin number, routing information related to the financial institution associated with the account, security code, or other like information relating to the user account. The tokens may then be utilized as a payment instrument to complete a transaction. In yet another embodiment, the payment credentials may include any other information that may be used to access funds from one or more financial institution accounts of the user, for example, a debit card, credit card, checkcard, ATM card, paper check, electronic check, wire transfer, cash, online bill pay, automated clearing house (ACH), wireless and/or contactless payment, and/or the like.

In some embodiments, the block chain of device records may be managed by a third party different from the financial institutions associated with the user. In this way, member institutions may be provided access to the block chain for verification and validation of authentication credentials associated with the user using the mobile device. The financial institution that the user initially accesses as the access point to the block chain network is considered the "host institution" and the systems of the host institution may be referred to as "host systems". A "source institution" is a financial institution other than the host institution that has device records of a user and the systems of the source institution may be referred to as "source systems". Financial institutions may function as both source institutions and host institutions depending on whether the financial institution is the access point selected by the user. In some embodiments, the user may access a transaction terminal using the user device by selecting one or more financial credentials associated with a member institution. When the member institution receives an indication that the user has access to a transaction terminal using the user device and and financial credentials associated with the member institution, the member institution may assess the block chain to determine whether the authentication credentials (unique identifier) associated with the user meets the condition of the block chain.

To validate a unique identifier, the financial institution accesses the distributed ledger and determines whether the unique identifier associated with the user meets one or more conditions. This may be considered to validate the unique identifier. The unique identifier may include an authentication key or signature that is recognized by member institutions as being part of the block chain. The authentication information on the distributed ledger may be accessed by each financial institution that is member of the block chain. The member institutions of the block chain may have a complete or partial copy of the entire ledger or set of device records and/or blocks on the block chain. Each unique identifier is validated based on logic/rules of a smart contract associated with the financial institution or entered into an agreed-upon by member institutions.

In various embodiments, the block chain may be configured with a set of rules to dictate when and how the authentication credentials are validated and other details about how the network communicates data and the like. In some embodiments, the rules dictate that a source institution must validate all authentication credentials. In some embodiments, the rules dictate that some or all authentication credentials may be approved by one or more validation institutions. A validation institution may be one or more of the financial institutions on the block chain that validate transactions for other financial institutions on the block chain. In some such cases, the rules dictate that the authentication information created by a source institution, also includes additional information that is useful in determining whether requests associated with the authentication credentials should be approved. In other embodiments, the validation institution must reach out to the host institution in certain situations as dictated by the rules. In some embodiments, more than one institution must validate an authentication credential before it may be posted to the block chain as a validated device record. In some embodiments, the validation institution may not be a financial institution.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
| --- | --- | --- |
| 14/942,326, now published as U.S. Patent Application Publication No. 2017/0140408 | TRANSPARENT SELF-MANAGING REWARDS PROGRAM USING BLOCKCHAIN AND SMART CONTRACTS | Nov. 16, 2015 |
| 15/041,555, now published as U.S. Patent Application Publication No. 2017/0132630 | BLOCK CHAIN ALIAS FOR PERSON-TO-PERSON PAYMENTS | Feb. 11, 2016 |
| 62/253,935 | BLOCK CHAIN ALIAS PERSON-TO-PERSON PAYMENT | Nov. 11, 2015 |
| 15/041,566, now published as U.S. Patent Application Publication No. 2017/0132615 | BLOCK CHAIN ALIAS PERSON-TO-PERSON PAYMENTS | Feb. 11, 2016 |
| 15/050,375, now U.S. Pat. No. 10,135,870 | SYSTEM FOR CONVERSION OF AN INSTRUMENT FROM A NON-SECURED INSTRUMENT TO A SECURED INSTRUMENT IN A PROCESS DATA NETWORK | Feb. 22, 2016 |
| 15/050,379, now published as U.S. Patent Application Publication No. 2017/0243215 | SYSTEM FOR EXTERNAL SECURE ACCESS TO PROCESS DATA NETWORK | Feb. 22, 2016 |
| 15/050,358 now U.S. Pat. No. 10,178,105 | SYSTEM FOR PROVIDING LEVELS OF SECURITY ACCESS TO A PROCESS DATA NETWORK | Feb. 22, 2016 |
| 62/293,585 | SYSTEM FOR SECURE ROUTING OF DATA TO VARIOUS NETWORKS FROM A PROCESS DATA NETWORK | Feb. 10, 2016 |
| 62/293,620 | SYSTEM FOR CENTRALIZED CONTROL OF SECURE ACCESS TO PROCESS DATA NETWORK | Feb. 10, 2016 |
| 15/049,605 now U.S. Pat. No. 10,129,238 | SYSTEM FOR CONTROL OF SECURE ACCESS AND COMMUNICATION WITH DIFFERENT PROCESS DATA NETWORKS WITH SEPARATE SECURITY FEATURES | Feb. 22, 2016 |
| 15/049,716, now published as U.S. Patent Application Publication No. 2017/0243208 | SYSTEM FOR CONTROL OF DEVICE IDENTITY AND USAGE IN A PROCESS DATA NETWORK | Feb. 22, 2016 |
| 15/049,777 now U.S. Pat. No. 10,142,312 | SYSTEM FOR ESTABLISHING SECURE ACCESS FOR USERS IN A PROCESS DATA NETWORK | Feb. 22, 2016 |
| 15/049,835 now U.S. Pat. No. 10,026,118 | SYSTEM FOR ALLOWING EXTERNAL VALIDATION OF DATA IN A PROCESS DATA NETWORK | Feb. 22, 2016 |
| 15/050,094 now U.S. Pat. No. 10,116,667 | SYSTEM FOR CONVERSION OF AN INSTRUMENT FROM A NON-SECURED INSTRUMENT TO A SECURED INSTRUMENT IN A PROCESS DATA NETWORK | Feb. 22, 2016 |
| 62/287,293 | SYSTEM FOR CONVERSION OF AN INSTRUMENT FROM A NON-SECURED INSTRUMENT TO A SECURED INSTRUMENT IN A PROCESS DATA NETWORK | Jan. 26, 2016 |
| 15/050,098, now published as U.S. Patent Application Publication No. 2017/0213221 | SYSTEM FOR TRACKING AND VALIDATION OF MULTIPLE INSTANCES OF AN ENTITY IN A PROCESS DATA NETWORK | Feb. 22, 2016 |
| 62/287,301 | SYSTEM FOR TRACKING AND VALIDATION OF MULTIPLE INSTANCES OF AN ENTITY IN A PROCESS DATA NETWORK | Jan. 26, 2016 |
| 15/050,084 now U.S. Pat. No. 9,825,931 | SYSTEM FOR TRACKING AND VALIDATION OF AN ENTITY IN A PROCESS DATA NETWORK | Feb. 22, 2016 |
| 62/287,298 | SYSTEM FOR TRACKING AND VALIDATION OF AN ENTITY IN A PROCESS DATA NETWORK | Jan. 26, 2016 |
| 15/050,372, now published as U.S. Patent Application Publication No. 2017/0243217 | SYSTEM FOR ROUTING OF PROCESS AUTHORIZATIONS AND SETTLEMENT TO A USER IN A PROCESS DATA NETWORK | Feb. 22, 2016 |
| 15/050,285 now U.S. Pat. No. 10,318,938 | SYSTEM FOR ROUTING OF PROCESS AUTHORIZATION AND SETTLEMENT TO A USER IN PROCESS DATA NETWORK | Feb. 22, 2016 |

-continued

| U.S. patent application Ser. No. | Title | Filed On |
|---|---|---|
| | BASED ON SPECIFIED PARAMETERS | |
| 15/050,292, now published as U.S. Patent Application Publication No. 2017/0243209 | SYSTEM FOR GRANT OF USER ACCESS AND DATA USAGE IN A PROCESS DATA NETWORK | Feb. 22, 2016 |
| 15/050,294, now published as U.S. Patent Application Publication No. 2017/0243212 | SYSTEM FOR IMPLEMENTING A DISTRIBUTED LEDGER ACROSS MULTIPLE NETWORK NODES | Feb. 22, 2016 |
| 15/049,865, now published as U.S. Patent Application Publication No. 2017/0244720 | SYSTEM FOR EXTERNAL VALIDATION OF PRIVATE-TO-PUBLIC TRANSITION PROTOCOLS | Feb. 22, 2016 |
| 15/049,852 now U.S. Pat. No. 10,140,470 | SYSTEM FOR EXTERNAL VALIDATION OF DISTRIBUTED RESOURCE STATUS | Feb. 22, 2016 |
| 15/050,316, now published as U.S. Patent Application Publication No. 2017/0243214 | SYSTEM FOR TRACKING TRANSFER OF RESOURCES IN A PROCESS DATA NETWORK | Feb. 22, 2016 |
| 15/050,321, now published as U.S. Patent Application Publication No. 2017/0243287 | SYSTEM FOR MANAGING SERIALIZABILITY OF RESOURCE TRANSFERS IN A PROCESS DATA NETWORK | Feb. 22, 2016 |

What is claimed is:

1. A system operatively connected with a block chain distributed network and for using the block chain distributed network to enable contactless access to a transaction terminal using a process data network, the system comprising:
   a memory device storing logic and rules for the block chain; and
   a processing device operatively coupled to the memory device, wherein the processing device is configured to execute computer-readable program code to:
      electronically receive from a transfer terminal, an indication that a user is accessing the transaction terminal using a user device;
      retrieve, from the user device, a unique identifier associated with the user device, wherein the unique identifier reflects one or more authentication credentials associated with the user, wherein the one or more authentication credentials comprises a private key associated with one or more financial institution accounts of the user;
      access a distributed ledger stored in the memory device, wherein the distributed ledger comprises a current state, wherein the current state encoded cryptographically using a hash chain of information associated with the one or more financial institution accounts of the user, wherein the distributed ledger is updated based on communications from a block chain distributed network, wherein the distributed ledger comprises one or more validated authentication credentials associated with the user and indicating at least an evolution of digital authentication associated with the user;
      compare, at an originating node, the unique identifier received from the user device with the one or more validated authentication credentials stored in the distributed ledger to determine whether the unique identifier meets a condition associated with the distributed ledger, wherein the condition comprises at least (i) determining a match between the unique identifier and at least one of the one or more validated authentication credentials stored in the distributed ledger, and (ii) determining a match between the unique identifier and the hash chain of information associated with the one or more financial institution accounts of the user;
      authorize the user device to access the transaction terminal based on at least determining the match between the unique identifier and at least one of the one or more validated authentication credentials stored in the distributed ledger and/or the match between the unique identifier and the hash chain of information associated with the one or more financial institution accounts of the user;
      receive, from the user, one or more additional authentication credentials associated with the user in addition to the unique identifier;
      determine that at least one of the one or more additional authentication credentials meets a condition associated with the block chain, thereby verifying the identity of the user;
      update the block chain of authentication information with the one or more additional authentication credentials based on at least verifying the identity of the user;
      transmit a request to one or more sources to validate the one or more additional authentication credentials and the unique identifier based on the logic and rules for the block chain;
      initiate, using one or more computing devices associated with the one or more sources, a block chain validation process to validate the one or more additional authentication credentials and the unique identifier based on at least a smart contract logic associated with the originating node and agreed upon by the one or more sources;
      receive an indication that the one or more additional authentication credentials and the unique identifier has been validated; and
      store the one or more additional authentication credentials and the unique identifier on the distributed ledger based on at least receiving the indication that the one or more authentication credentials and the unique identifier has been validated.

2. The system of claim 1, wherein the processing device is configured to execute computer-readable program code further to:
   determine a percentage score based on at least comparing between the unique identifier with the one or more validated authentication credentials associated with the user.

3. The system of claim 2, wherein the processing device is configured to execute computer-readable program code further to:
   determine one or more functions that the user wishes to execute by accessing the transaction terminal;

determine whether the percentage score meets a matching requirement associated with the one or more functions that the user wishes to execute; and enable the user to execute the one or more functions based on at least determining that the percentage score meets the matching requirement.

4. The system of claim 1, wherein the processing device is configured to execute computer-readable program code further to:

receive a request from the one or more computing devices associated with the one or more sources to access the distributed ledger;

determine that the one or more computing devices associated with the one or more sources has authorized access to the distributed ledger; and authorize the one or more computing devices associated with the one or more sources to access the distributed ledger.

5. The system of claim 4, wherein the processing device is configured to execute computer-readable program code further to:

receive one or more authentication credentials from the one or more computing devices associated with the one or more sources;

validate the one or more authentication credentials; and authorize the one or more sources to access the distributed ledger in response to validating the one or more authentication credentials.

6. The system of claim 1, wherein the processing device is configured to execute computer-readable program code further to:

receive an indication that the one or more additional authentication credentials has been validated; and store the one or more additional authentication credentials on the distributed ledger based on at least receiving the indication that the unique identifier has been validated.

7. A computerized method using the block chain distributed network to enable contactless access to a transaction terminal using a process data network, the method comprising:

electronically receiving, using a computing device processor, from a transfer terminal, an indication that a user is accessing the transaction terminal using a user device;

retrieving, using a computing device processor, from the user device, a unique identifier associated with the user device, wherein the unique identifier reflects one or more authentication credentials associated with the user, wherein the one or more authentication credentials comprises a private key associated with one or more financial institution accounts of the user;

accessing, using a computing device processor, a distributed ledger stored in a memory device, wherein the distributed ledger comprises a current state, wherein the current state encoded cryptographically using a hash chain of information associated with the one or more financial institution accounts of the user, wherein the distributed ledger is updated based on communications from a block chain distributed network, wherein the distributed ledger comprises one or more validated authentication credentials associated with the user and indicating at least an evolution of digital authentication associated with the user;

comparing, using a computing device processor, at an originating node, the unique identifier received from the user device with the one or more validated authentication credentials stored in the distributed ledger to determine whether the unique identifier meets a condition associated with the distributed ledger, wherein the condition comprises at least (i) determining a match between the unique identifier and at least one of the one or more validated authentication credentials stored in the distributed ledger, and (ii) determining a match between the unique identifier and the hash chain of information associated with the one or more financial institution accounts of the user;

authorizing, using a computing device processor, the user device to access the transaction terminal based on at least determining the match between the unique identifier and at least one of the one or more validated authentication credentials stored in the distributed ledger and/or the match between the unique identifier and the hash chain of information associated with the one or more financial institution accounts of the user;

receiving, using a computing device processor, from the user, one or more additional authentication credentials associated with the user in addition to the unique identifier;

determining, using a computing device processor, that at least one of the one or more additional authentication credentials meets a condition associated with the block chain, thereby verifying the identity of the user;

updating, using a computing device processor, the block chain of authentication information with the one or more additional authentication credentials based on at least verifying the identity of the user;

transmitting, using a computing device processor, a request to one or more sources to validate the one or more additional authentication credentials and the unique identifier based on logic and rules for the block chain;

initiating, using one or more computing devices associated with the one or more sources, a block chain validation process to validate the one or more additional authentication credentials and the unique identifier based on at least a smart contract logic associated with the originating node and agreed upon by the one or more sources;

receiving, using a computing device processor, an indication that the one or more additional authentication credentials and the unique identifier has been validated; and storing, using a computing device processor, the one or more additional authentication credentials and the unique identifier on the distributed ledger based on at least receiving the indication that the one or more authentication credentials and the unique identifier has been validated.

8. The method of claim 7, wherein the method further comprises:

determining a percentage score based on at least comparing between the unique identifier with the one or more validated authentication credentials associated with the user.

9. The method of claim 8, wherein the method further comprises:

determining one or more functions that the user wishes to execute by accessing the transaction terminal;

determining whether the percentage score meets a matching requirement associated with the one or more functions that the user wishes to execute; and enabling the user to execute the one or more functions based on at least determining that the percentage score meets the matching requirement.

10. The method of claim 7, wherein the method further comprises:
receiving a request from the one or more computing devices associated with the one or more sources to access the distributed ledger;
determining that the one or more computing devices associated with the one or more sources has authorized access to the distributed ledger; and
authorizing the one or more computing devices associated with the one or more sources to access the distributed ledger.

11. The method of claim 10, wherein the method further comprises:
receiving one or more authentication credentials from the one or more computing devices associated with the one or more sources;
validating the one or more authentication credentials; and
authorizing the one or more sources to access the distributed ledger in response to validating the one or more authentication credentials.

12. The method of claim 7, wherein the method further comprises:
receiving an indication that the one or more additional authentication credentials has been validated; and
storing the one or more additional authentication credentials on the distributed ledger based on at least receiving the indication that the unique identifier has been validated.

13. A computer program product for execution on a system operatively connected with the block chain distributed network, the computer program product for using the block chain distributed network using the block chain distributed network to enable contactless access to a transaction terminal using a process data network, the computer program product comprising at least one non-transitory computer-readable medium having computer-readable program code portions embodied therein, the computer-readable program code portions causing a first apparatus to:
electronically receive from a transfer terminal, an indication that a user is accessing the transaction terminal using a user device;
retrieve, from the user device, a unique identifier associated with the user device, wherein the unique identifier reflects one or more authentication credentials associated with the user, wherein the one or more authentication credentials comprises a private key associated with one or more financial institution accounts of the user;
access a distributed ledger stored in a memory device, wherein the distributed ledger comprises a current state, wherein the current state encoded cryptographically using a hash chain of information associated with the one or more financial institution accounts of the user, wherein the distributed ledger is updated based on communications from a block chain distributed network, wherein the distributed ledger comprises one or more validated authentication credentials associated with the user and indicating at least an evolution of digital authentication associated with the user;
compare, at an originating node, the unique identifier received from the user device with the one or more validated authentication credentials stored in the distributed ledger to determine whether the unique identifier meets a condition associated with the distributed ledger, wherein the condition comprises at least (i) determining a match between the unique identifier and at least one of the one or more validated authentication credentials stored in the distributed ledger, and (ii) determining a match between the unique identifier and the hash chain of information associated with the one or more financial institution accounts of the user;
authorize the user device to access the transaction terminal based on at least determining the match between the unique identifier and at least one of the one or more validated authentication credentials stored in the distributed ledger and/or the match between the unique identifier and the hash chain of information associated with the one or more financial institution accounts of the user;
receive, from the user, one or more additional authentication credentials associated with the user in addition to the unique identifier;
determine that at least one of the one or more additional authentication credentials meets a condition associated with the block chain, thereby verifying the identity of the user;
update the block chain of authentication information with the one or more additional authentication credentials based on at least verifying the identity of the user;
transmit a request to one or more sources to validate the one or more additional authentication credentials and the unique identifier based on the logic and rules for the block chain;
initiate, using one or more computing devices associated with the one or more sources, a block chain validation process to validate the one or more additional authentication credentials and the unique identifier based on at least a smart contract logic associated with the originating node and agreed upon by the one or more sources;
receive an indication that the one or more additional authentication credentials and the unique identifier has been validated; and
store the one or more additional authentication credentials and the unique identifier on the distributed ledger based on at least receiving the indication that the one or more authentication credentials and the unique identifier has been validated.

14. The computer program product of claim 13, wherein the first apparatus is further configured to:
determine a percentage score based on at least comparing between the unique identifier with the one or more validated authentication credentials associated with the user.

15. The computer program product of claim 14, wherein the first apparatus is further configured to:
determine one or more functions that the user wishes to execute by accessing the transaction terminal;
determine whether the percentage score meets a matching requirement associated with the one or more functions that the user wishes to execute; and
enable the user to execute the one or more functions based on at least determining that the percentage score meets the matching requirement.

16. The computer program product of claim 13, wherein the first apparatus is further configured to:
receive a request from the one or more computing devices associated with the one or more sources to access the distributed ledger;
determine that the one or more computing devices associated with the one or more sources has authorized access to the distributed ledger; and authorize the one or more computing devices associated with the one or more sources to access the distributed ledger.

17. The computer program product of claim 16, wherein the first apparatus is further configured to:
   receive one or more authentication credentials from the one or more computing devices associated with the one or more sources;
   validate the one or more authentication credentials; and
   authorize the one or more sources to access the distributed ledger in response to validating the one or more authentication credentials.

18. The computer program product of claim 13, wherein the first apparatus is further configured to:
   receive an indication that the one or more additional authentication credentials has been validated; and
   store the one or more additional authentication credentials on the distributed ledger based on at least receiving the indication that the unique identifier has been validated.

* * * * *